United States Patent
Balasubramanian et al.

(10) Patent No.: US 11,661,035 B2
(45) Date of Patent: May 30, 2023

(54) FAULT DIAGNOSTICS IN AIRCRAFT WINDSHIELD WIPER SYSTEMS

(71) Applicant: Goodrich Corporation, Charlotte, NC (US)

(72) Inventors: Rameshkumar Balasubramanian, Karnataka (IN); Sujoy Khanra, Karnataka (IN)

(73) Assignee: GOODRICH CORPORATION, Charlotte, NC (US)

(*) Notice: Subject to any disclaimer, the term of this patent is extended or adjusted under 35 U.S.C. 154(b) by 0 days.

(21) Appl. No.: 17/746,546

(22) Filed: May 17, 2022

(65) Prior Publication Data

US 2022/0340104 A1    Oct. 27, 2022

Related U.S. Application Data

(62) Division of application No. 16/199,948, filed on Nov. 26, 2018, now Pat. No. 11,332,100.

(30) Foreign Application Priority Data

Aug. 17, 2018   (IN) .............................. 201811030858

(51) Int. Cl.
*B60S 1/08* (2006.01)
*B60S 1/26* (2006.01)
*B60S 1/38* (2006.01)
*B64D 45/00* (2006.01)

(52) U.S. Cl.
CPC .......... *B60S 1/0862* (2013.01); *B60S 1/0814* (2013.01); *B60S 1/26* (2013.01); *B60S 1/38* (2013.01); *B64D 45/00* (2013.01); *B60S 2001/3844* (2013.01)

(58) Field of Classification Search
CPC .... B64D 45/00; B60S 2001/3844; B60S 1/38; B60S 1/26; B60S 1/0814; B60S 1/0862
USPC ....................................................... 15/250.12
See application file for complete search history.

(56) References Cited

U.S. PATENT DOCUMENTS

| 5,313,151 | A | * | 5/1994 | Ogden | .................. G01R 31/34 318/432 |
| 5,404,085 | A | | 4/1995 | Resch et al. | |
| 5,483,841 | A | * | 1/1996 | Casada | ..................... G01P 3/48 73/862.193 |
| 6,281,649 | B1 | | 8/2001 | Ouellette et al. | |
| 8,890,074 | B2 | | 11/2014 | Kim et al. | |
| 2004/0176887 | A1 | | 9/2004 | Kent et al. | |

FOREIGN PATENT DOCUMENTS

| EP | 3120979 A1 | 1/2017 |
| GB | 2484960 A | 5/2012 |

OTHER PUBLICATIONS

Search Report issued in European Patent Application No. 19191123.9; Application Filing Date Aug. 9, 2019; dated Nov. 29, 2019 (10 pages).

* cited by examiner

*Primary Examiner* — Katina N. Henson
(74) *Attorney, Agent, or Firm* — Cantor Colburn LLP

(57) ABSTRACT

A windshield wiper system (WWS) is provided. The WWS includes a brushless direct current (BLDC) motor, a wiper arm and blade, a gearbox/converter operably interposed between the BLDC motor and the wiper arm and blade and a smart motor drive configured to determine a WWS failure condition and to operate the BLDC motor according to the determination.

9 Claims, 5 Drawing Sheets

| | TRIP CURRENT | OVER CURRENT | NOMINAL CURRENT | UNDER CURRENT | NO LOAD CURRENT |
|---|---|---|---|---|---|
| HIGHER TORQUE | BIRD STRIKE OR ARM LOCK | HEAVY ICE ON WINDSHIELD | | | ∞ |
| NOMINAL TORQUE | | DRY GLASS OR HIGH DUST OR ICE FORMATION IN THE WINDSHIELD | | | |
| LOWER TORQUE | | BEARING FAILURE | NO FAULT/NORMAL OPERATION | | |
| | | | | BLADE RUBBER TEAR | |
| | | | | ARM BREAKAGE OR BLADE LOSS | |
| 0 | GEARBOX JAM | | ROTOR SHAFT SHEAR | GEAR TEETH SHEAR | OUTPUT SHAFT SHEAR |

CURRENT DRAWN BY MOTOR / TORQUE MEASURED BY STRAIN GAUGE

FIG. 4

FAULT DIAGNOSTICS IN AIRCRAFT WINDSHIELD WIPER SYSTEMS

CROSS-REFERENCE TO RELATED APPLICATIONS

This application is a divisional of U.S. application Ser. No. 16/199,948, filed Nov. 26, 2018, which claims the benefit of Indian Patent Application No. 201811030858 filed Aug. 17, 2018, which is incorporated herein by reference in its entirety.

BACKGROUND

The following description relates to windshield wiper systems (WWSs) of aircraft and, more specifically, to fault diagnostics in WWSs of aircraft.

A WWS of an aircraft is used for cleaning rain, sand, dust, etc. from a windshield. Generally, a WWS includes a wiper arm that needs to move in both clockwise and counter-clockwise directions within a specific angle to keep the windshield clean for the pilot/co-pilot to have good visibility. The wiper arm is typically moved by a shaft that is connected to a motor through gearing but there are various design configurations available and each has its own advantages and disadvantages.

Typically, a WWS of an aircraft is operated as follows. Initially, pilot or co-pilot input activates an electronic control unit (ECU) and the ECU controls a BLDC motor accordingly. The ECU periodically reverses the BLDC motor direction to achieve oscillatory motion at the output shaft of the BLDC motor. The BLDC motor output shaft interfaces with a two-stage gear train to achieve required torque and speed at the gearbox output shaft. This oscillatory motion at the gearbox output shaft is transferred to the wiper externals.

Thus, a WWS is a predominantly mechanical system and an identification of a failure is often limited to those failures that are visible to human eyes (that is, failures can only be identified when they are physical damages of the wiper externals such as arms and blades). As such, some airlines include a checking of a WWS as part of the pre-flight checklist especially when they anticipate flying into precipitation conditions, but the checking is still limited to visual inspection. More commonly, WWS inspections are done at an interval (e.g., about 2,500 flight hours for the wiper arms and about 1,800 flight hours for the wiper blades) in order to meet certain specified goals.

The interval inspection routine can result in intermittent WWS failures that can cause airlines to cancel flights and to go through unscheduled maintenance required for WWS replacements. Moreover, since wiper arms and blades are generally treated as consumable items, airlines have to maintain a large inventory of parts.

BRIEF DESCRIPTION

According to an aspect of the disclosure, a windshield wiper system (WWS) is provided. The WWS includes a brushless direct current (BLDC) motor, a wiper arm and blade, a gearbox/converter operably interposed between the BLDC motor and the wiper arm and blade and a smart motor drive configured to determine a WWS failure condition and to operate the BLDC motor according to the determination.

In accordance with additional or alternative embodiments, the WWS further includes a switch input by which pilot commands are input to the smart motor drive and a central fault display by which the smart motor drive displays information associated with the WWS failure condition.

In accordance with additional or alternative embodiments, the WWS further includes a fault log repository in which the smart motor drive stores information associated with the WWS failure condition.

In accordance with additional or alternative embodiments, the smart motor drive is coupled to the BLDC motor and includes a failure diagnostic system (FDS) in which the WWS failure condition is determined.

In accordance with additional or alternative embodiments, the WWS further includes at least one of a first sensor operably interposed between the smart motor drive and the BLDC motor and a second sensor operably interposed between the gearbox converter and the wiper arm and blade.

In accordance with additional or alternative embodiments, the FDS is receptive of readings from the at least one of the first and second sensors and determines the WWS failure condition based on the readings.

In accordance with additional or alternative embodiments, the FDS is receptive of readings from the first sensor and determines the WWS failure condition based on the readings being indicative of a nominal current condition, an under-current condition, an over-current condition, a zeroed current condition and a trip current condition.

In accordance with additional or alternative embodiments, the first and second sensors include a current sensor and a strain gauge, respectively, the FDS is receptive of readings from the current sensor and the strain gauge and the FDS determines the WWS failure condition based on the readings from the current sensor indicating nominal, zeroed, trip, normal, under- or over-current conditions cross-referenced with the readings from the strain gauge indicating nominal, zeroed, low-, high- or very high-torque conditions.

In accordance with additional or alternative embodiments, the WWS further includes at least one of a current sensor operably interposed between the smart motor drive and the BLDC motor, a position sensor operably interposed between the BLDC motor and the gearbox/converter and a strain gauge operably interposed between the gearbox converter and the wiper arm and blade.

According to additional or alternative embodiments, a windshield wiper system (WWS) is provided and includes a gearbox/converter operably interposed between a BLDC motor and wiper arms and blades and a smart motor drive configured to determine a WWS failure condition from current readings drawn from a current sensor operably interposed between the smart motor drive and the BLDC motor cross-referenced with torque readings from a strain gauge operably interposed between the gearbox/converter and the wiper arm and blade and to operate the BLDC motor according to the determination.

In accordance with additional or alternative embodiments, the WWS further includes a switch input by which pilot commands are input to the smart motor drive and a central fault display by which the smart motor drive displays information associated with the WWS failure condition.

In accordance with additional or alternative embodiments, the WWS further includes a fault log repository in which the smart motor drive stores information associated with the WWS failure condition.

In accordance with additional or alternative embodiments, the smart motor drive is coupled to the BLDC motor and includes a failure diagnostic system (FDS) in which the WWS failure condition is determined.

In accordance with additional or alternative embodiments, the FDS is receptive of the current and torque readings and the FDS determines the WWS failure condition based on the current readings indicating nominal, zeroed, under-, over-current or trip current conditions cross-referenced with the torque readings indicating nominal, low-, very low, high-, or very high torque conditions.

According to another aspect of the invention, a method of operating a windshield wiper system is provided and includes reading current drawn by a motor of the WWS, reading torque of a gearbox output shaft of the WWS and determining a failure condition from the reading of the current cross-referenced with the reading of the torque.

In accordance with additional or alternative embodiments, the determining includes determining the failure condition from the reading of the current indicating a zeroed, trip, nominal, under- or over-current conditions cross-referenced with the reading of the torque indicating a zeroed, nominal, low-, high- or very high-torque.

In accordance with additional or alternative embodiments, the method further includes displaying information associated with the failure condition.

In accordance with additional or alternative embodiments, the method further includes storing information associated with the failure condition.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

FIG. 4 is a graphical depiction of fault/failure identification using current information cross-referenced with torque measurements in accordance with embodiments.

These and other advantages and features will become more apparent from the following description taken in conjunction with the drawings.

DETAILED DESCRIPTION

As will be described below, a WWS is provided and includes a motor drive, a motor, a gearbox/converter, current and position sensors, a signal conditioning unit, an arm and a blade as well as a strain gauge, a failure diagnostic system (FDS) and a fault log repository. As such, the WWS has mechanisms to identify failures, particularly failures in wiper internals, and to isolate faults and/or failures, to provide for data-based failure identification or a root cause analysis and to provide for store of the data associated with the faults for preventive maintenance or for future analysis.

Figure 1:
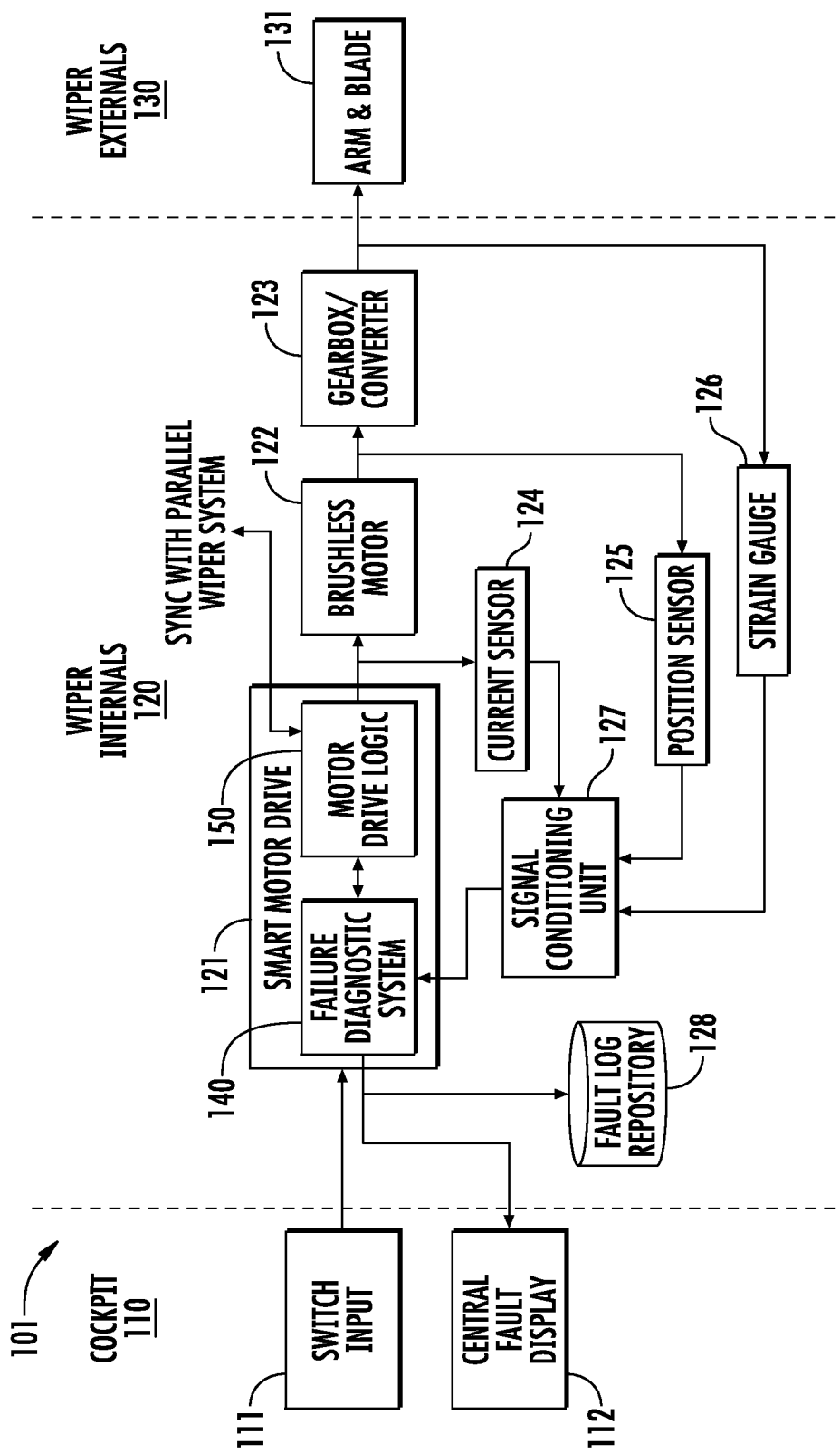
FIG. 1 schematically illustrates a detailed architecture of a WWS in accordance with embodiments.

With reference to FIG. 1, a WWS 101 is provided and includes a cockpit portion 110, wiper internals 120 and wiper externals 130. The cockpit portion 110 includes a switch input device 111 and a central fault display 112. The wiper internals 120 include a smart motor drive 121, a brushless direct current (BLDC) motor 122, a gearbox/converter 123, as well as a current sensor 124 operably interposed between the smart motor drive 121 and the BLDC motor 122, a position sensor 125 operably interposed between the BLDC motor 122 and the gearbox/converter 123, a strain gauge 126 operably interposed between the gearbox/converter 123 and the wiper externals 130, a signal conditioning unit 127 and a fault log repository 128. The smart motor drive 121 includes a failure diagnostic system (FDS) 140 and motor drive logic 150, which can be synced with a parallel wiper system. The wiper externals 130 include wiper arms and blades 131.

During an operation of the WWS 101, pilot inputted commands are input by way of the switch input device 111 and are transmitted to the smart motor drive 121. This initiates the motor drive logic 150, which, in turn, outputs current to the BLDC motor 122. The current drives the BLDC motor 122 to generate torque that is transferred to wiper arms and blades 131 via the gearbox/converter 123. The current sensor 124 senses the current outputted to the BLDC motor 122 by the motor drive logic 150 and transmits a current sensor reading to the signal conditioning unit 127. The position sensor 125 senses a position signal output from the BLDC motor 122 to the gearbox/converter 123 and transmits a position sensor reading to the signal conditioning unit 127. The strain gauge 126 measures strain between the gearbox/converter 123 and the wiper arms and blades 131 and transmits a strain gauge reading to the signal conditioning unit 127.

Figure 2:
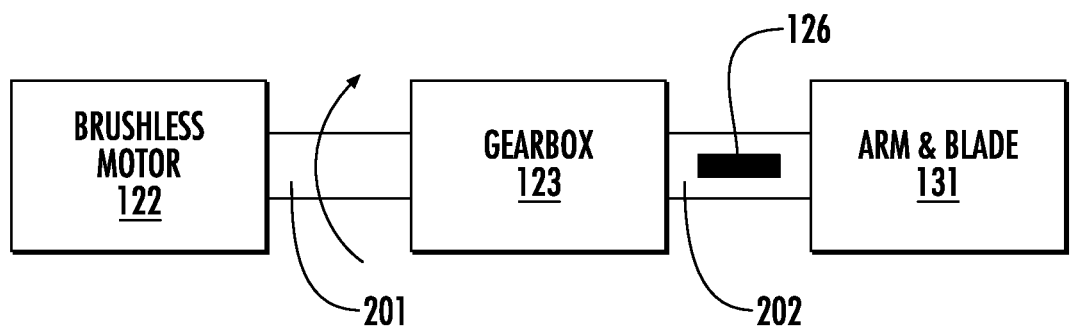
FIG. 2 illustrates an installation of a strain gauge in the WWS of FIG. 1 in accordance with embodiments.

With reference to FIG. 2, the gearbox/converter 123 is connected to the BLDC motor 122 by a rotatable motor shaft 201 and the wiper arms and blades 131 are connected to the gearbox/converter 123 by a gearbox output shaft 202. The strain gauge 126 may be operably disposed along the gearbox output shaft 202.

The signal conditioning unit 127 is thus receptive of the current sensor reading, the position sensor reading and the strain gauge reading and outputs signals reflective thereof to the FDS 140. The FDS 140 executes failure diagnostics on the signals received from the signal conditioning unit 127 and determines whether failures or degraded performance issues are indicated. The FDS 140 then adjusts an operation of the motor drive logic 150 accordingly, saves data associated with the determination in the fault log repository 128 and issues a signal to the central fault display 112 so that the central fault display 112 can notify operators as to the situation.

In accordance with embodiments, the smart motor drive 121 may be provided as a microprocessor or as a microcontroller-based computing unit that implements the FDS 140 and the motor drive logic 150 and effectively acquires the data from the current sensor 124, the position sensor 125 and the strain gauge 126 by way of the signal conditioning unit 127. The smart motor drive 121 or, more particularly, the FDS 140 calculates a gap between desired and actual performances of the wiper arms and blades 131 and generates and issues appropriate commands (e.g., shut down commands, maintenance mode commands, intermittent operation commands, etc.) to the BLDC motor 122.

The FDS 140 monitors the sensors data, convolutes the data and information generated from the readings of the current sensor 124, the position sensor 125 and the strain gauge 126 together, performs diagnostic analysis via data patterns, identifies faults in the WWS 101 and isolates any faulty parts. The FDS 140 also stores data and information relating to those faults in the fault log repository 128 as volatile or non-volatile memory and causes the faults to be reported by way of the central fault display 112 for informational and maintenance purposes. The FDS 140 can be connected to the fault log repository 128 and the central fault display 112 by various connections, including, but not limited to, wireless communication interfaces like Wi-Fi, Bluetooth, and UHF etc., via wired communication interface like CAN, Ethernet etc., and/or to various avionics systems like a flight management system (FMS), an aircraft interface device and primary or secondary flight control units, etc.

Faults that can be identified by the FDS 140 include, but are not limited to, shaft breakage (i.e., a breakage of the gearbox output shaft 202), arm breakage, blade loss, wiper blades scratching the windshield, etc., and can be identified by the FDS 140 monitoring the current drawn by the electronics of the WWS 101, the position of the wiper arms and blades 131 and the strain exercised on the gearbox output shaft 202.

The FDS 140 may include intelligence/logic to monitor the degradation of operating performance of the WWS 101 over a period of time by monitoring an exceedance count (i.e., a number of times the monitoring parameter is outside a permissible limit) of current sensor output and strain gauge output to predict faults.

Figure 3:
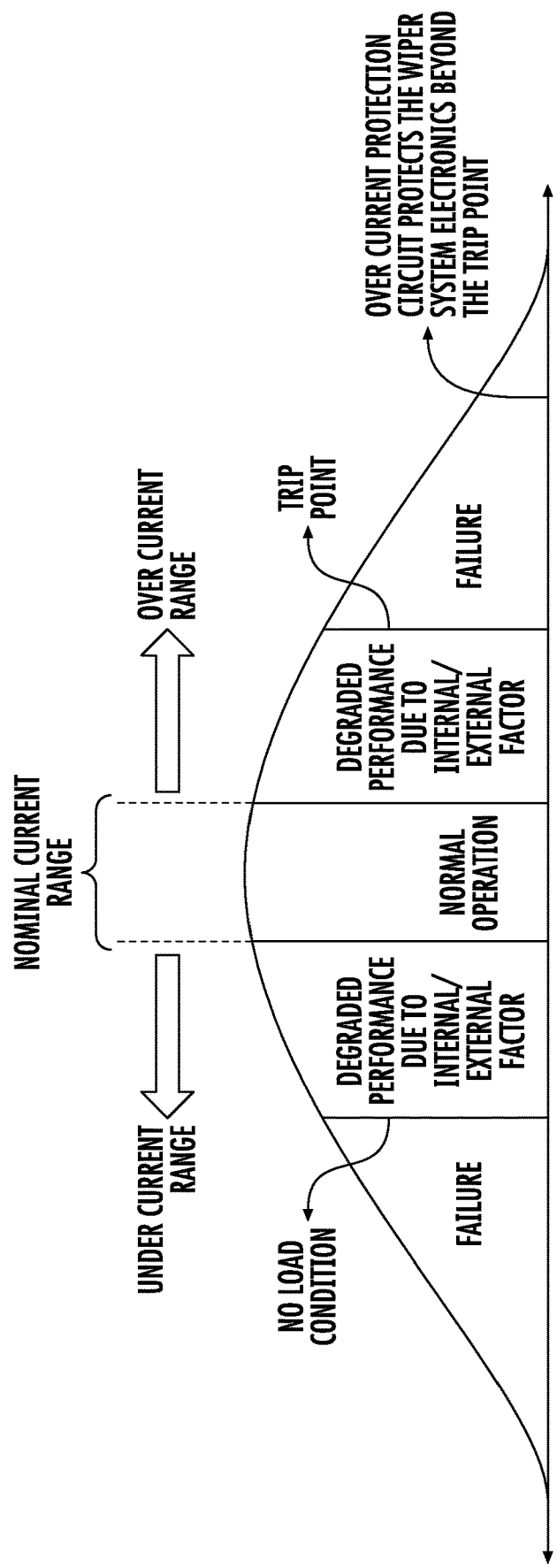
FIG. 3 graphically depicts a drawn current profile of the WWS of FIG. 1 in accordance with embodiments.

With reference to FIG. 3, the current sensor 124 can determine a current drawn profile of the WWS 101 which can, in turn, help the FDS 140 determine a performance condition of the WWS 101. That is, using the readings of the current sensor 124, the FDS 140 can determine whether the WWS 101 is operating normally or in a degraded mode due to internal/external factors. As shown in FIG. 3, readings that are suggestive of a nominal current draw are suggestive of normal operations of the WWS 101. By contrast, readings that are suggestive of increasing under-current draws are suggestive of degraded performance due to internal/external factors and ultimately to WWS 101 failures. Similarly, readings that are suggestive of increasing over-current draws are suggestive of degraded performance due to internal/external factors and ultimately to WWS 101 failures.

With reference to FIG. 4, the readings of the current sensor 124 can be cross-referenced with one or both of readings of the position sensor 125 and the strain gauge 126. For example, where readings of the current sensor 124 and the strain gauge 126 are cross-referenced, it is possible to focus in on particular faults and failures. As shown in FIG. 4, readings of trip to zeroed current draws and a zeroed torque can be indicative of a gearbox jam, a rotor shaft shear incident, a gear teeth shear incident and an output shaft shear incident, respectively, Readings of low to zeroed current draws and a low torque can be indicative of a blade rubber tear incident and an arm breakage or brake loss, respectively, and readings of an over-current draw and a nominal current draw with a nominal torque can be indicative of a bearing failure and a no fault/normal operation condition, respectively. Similarly, an over-current reading with a high torque reading can be indicative of a dry glass or high dust or ice formation in the windshield condition and readings of trip and over-current draws with very high torque can be indicative of a bird strike or an arm lock and heavy ice formation, respectively.

Figure 5:
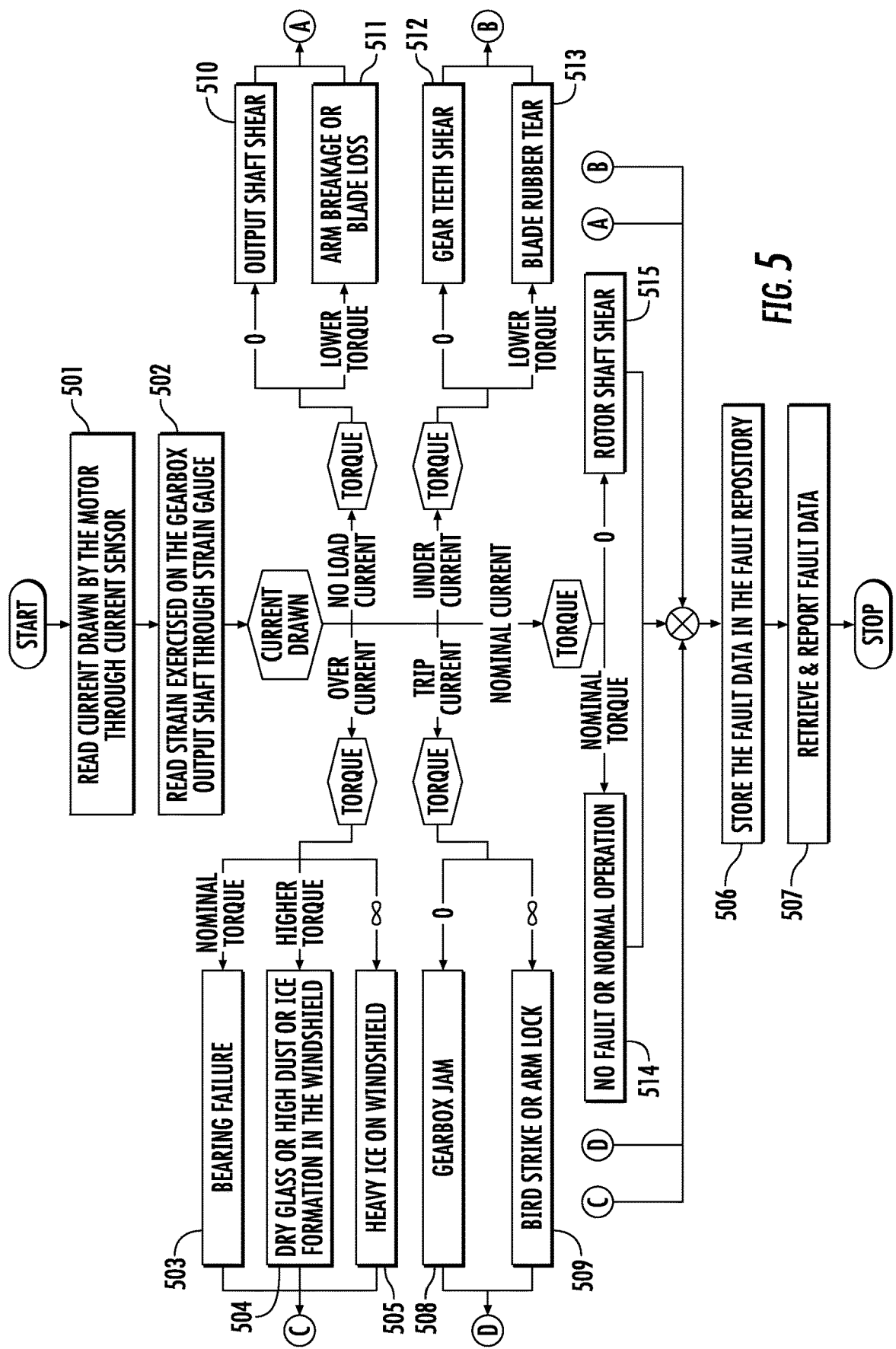
FIG. 5 is a flow diagram illustrating a method of performing fault diagnostics of a WWS in accordance with embodiments.

With reference to FIG. 5, an operational flow of fault diagnostics in the WWS 101 is provided. As shown in FIG. 5, current drawn by the BLDC motor 122 is read by the current sensor 124 (501) and strain exercised on the gearbox output shaft 202 is read by the strain gauge 126 (502). In an event an over-current incident is read in concert with nominal, high or very high torque, the FDS 140 determines that a bearing failure incident is in effect (503), a dry glass or high dust or ice formation incident is in effect (504) or that a heavy ice incident is in effect (505), respectively. Subsequently, fault data is stored in the fault log repository 128 (506) whereupon it can be retrieved and reported (507). In an event, a trip current incident is read in concert with a zero torque or very high torque incident, the FDS 140 determines that a gearbox jam incident is in effect (508) or a bird strike or arm lock incident is in effect (509), respectively. Subsequently, fault data is stored in the fault log repository 128 (506) whereupon it can be retrieved and reported (507). In an event a no-load current incident is read in concert with zeroed or low torque, the FDS 140 determines that an output shaft shear incident is in effect (510) or an arm breakage or blade loss incident is in effect (511), respectively. Subsequently, fault data is stored in the fault log repository 128 (506) whereupon it can be retrieved and reported (507). In an event an under-current incident is read in concert with zeroed or low torque, the FDS 140 determines that a gear teeth shear incident is in effect (512) or a blade rubber tear incident is in effect (513), respectively. Subsequently, fault data is stored in the fault log repository 128 (506) whereupon it can be retrieved and reported (507). In an event a nominal current incident is read in zeroed or nominal torque, the FDS 140 determines that normal operations are in effect (514) or a rotor shaft shear incident is in effect (515), respectively. Subsequently, fault data is stored in the fault log repository 128 (506) whereupon it can be retrieved and reported (507).

Benefits of the features described herein are improvements in passenger safety whereby failures in the WWS 101 are identified and known before takeoff, prevention of aircraft downtime, the use of preventative maintenance, a reduction in no fault found (NFF) instances and a reduction in an instance of degraded wipers. The diagnostic data from the WWS 101 helps in identifying failures and in planning repair or replacement of the WWS 101 to avoid aircraft down time and coincident revenue losses. Monitoring degraded WWS 101 performance helps in accurate planning of maintenance of the WWS 101 and avoids the need for ad hoc planning thereby reducing inventories. The diagnostic data can be shared and analyzed offline without hardware being removed from the aircraft to avoid the cost involved in logistics support. Real-time usage of FDS 140 data can drive WWS 101 at lower performance levels in case of nearly failing parts.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:
1. Windshield wiper system (WWS), comprising:
a gearbox/converter operably interposed between a brushless direct current (BLDC) motor and wiper arm and blade; and
a smart motor drive configured to determine a WWS failure condition from current readings drawn from a current sensor operably interposed between the smart motor drive and the BLDC motor cross-referenced with torque readings from a strain gauge operably interposed between the gearbox/converter and the wiper arm and blade and to operate the BLDC motor according to the determination of a WWS failure condition.

2. The WWS according to claim 1, further comprising:
a switch input by which pilot commands are input to the smart motor drive; and
a central fault display by which the smart motor drive displays information associated with the WWS failure condition.

3. The WWS according to claim 1, further comprising a fault log repository in which the smart motor drive stores information associated with the WWS failure condition.

4. The WWS according to claim 1, wherein the smart motor drive is coupled to the BLDC motor and comprises a failure diagnostic system (FDS) in which the WWS failure condition is determined.

5. The WWS according to claim 4, wherein:
the FDS is receptive of the current and torque readings, and
the FDS determines the WWS failure condition based on the current readings indicating nominal, zeroed, under-, over-current or trip current conditions cross-referenced with the torque readings indicating nominal, low-, very low, high-, or very high torque conditions.

6. A method of operating a windshield wiper system (WWS), the method comprising:
reading current drawn by a motor of the WWS drawn from a current sensor operably interposed between a smart motor drive and a brushless direct current (BLDC) motor;
reading torque of a gearbox output shaft of the WWS from a strain gauge operably interposed between a gearbox and a wiper arm and blade;
determining a WWS failure condition from the reading of the current cross-referenced with the reading of the torque; and
operating the BLDC motor according to a result of the determining of the WWS failure condition.

7. The method according to claim 6, wherein the determining comprises determining the failure condition from the reading of the current indicating a zeroed, trip, nominal, under- or over-current conditions cross-referenced with the reading of the torque indicating a zeroed, nominal, low-, high- or very high-torque.

8. The method according to claim 6, further comprising displaying information associated with the failure condition.

9. The method according to claim 6, further comprising storing information associated with the failure condition.

* * * * *